United States Patent
Grant

Patent Number: 5,113,831
Date of Patent: May 19, 1992

[54] FUEL PRESSURE REGULATOR

[76] Inventor: Barry Grant, Rte. 1, Box 1900, Dahlonega, Ga. 30533

[21] Appl. No.: 457,962

[22] Filed: Dec. 27, 1989

[51] Int. Cl.$^5$ ............................................. F02M 39/00
[52] U.S. Cl. .................................. 123/457; 123/467; 137/505.41; 137/901
[58] Field of Search .............. 123/510, 467, 447, 506, 123/457; 137/505.34, 901, 539, 505.41–505.42

[56] References Cited

U.S. PATENT DOCUMENTS

| | | | |
|---|---|---|---|
| 733,372 | 7/1903 | Colwell | 137/901 |
| 901,277 | 10/1908 | Bourne | 137/901 |
| 1,071,271 | 8/1913 | Spangler | 137/901 |
| 1,336,026 | 4/1920 | Dempsey | 137/901 |
| 1,374,308 | 4/1921 | MacIsaac | 137/901 |
| 1,921,178 | 4/1927 | Himes | 137/901 |
| 2,105,876 | 1/1938 | Birch | 137/505.41 |
| 2,699,179 | 1/1955 | Hansen | 137/539 |
| 2,777,456 | 1/1957 | Vey | 137/505.42 |
| 2,918,083 | 12/1959 | Clark | 137/515.5 |
| 2,979,067 | 4/1961 | Kern | 137/505.41 |
| 3,169,547 | 2/1965 | Pearl | 137/505.42 |
| 3,219,057 | 11/1965 | Knowles | 137/539 |
| 3,231,003 | 1/1966 | Richcreek | 123/457 |
| 3,421,547 | 1/1969 | Aslan | 137/539 |
| 3,524,469 | 8/1970 | Jebe | 137/543.19 |
| 3,938,542 | 2/1976 | Bolha | 137/505.41 |
| 4,091,839 | 5/1978 | Donner | 137/539 |
| 4,246,876 | 1/1981 | Bouwkamp | 123/467 |
| 4,700,741 | 10/1987 | Murphy | 137/539 |

FOREIGN PATENT DOCUMENTS 664158 8/1938 Fed. Rep. of Germany .......... 50/23

Primary Examiner—Carl Stuart Miller
Attorney, Agent, or Firm—Hopkins & Thomas

[57] ABSTRACT

A fuel pressure regulator (10) for automobiles and the like comprises a body lower portion (11), an upper cover (12) and a resilient diaphragm (66) therebetween. The resilient diaphragm (66) separates an upper chamber (61) from a fuel outlet chamber (21). A passageway (22) extends between the fuel outlet chamber and a fuel inlet chamber (14). A spherical ball valve (29) and a cylindrical valve seat (26) are positioned at one end of the passageway (22). A removable plug (32) carries guide legs (33) for guiding the ball valve (29) and further carries a biasing spring (31) for biasing the ball valve (29) into a closed seating position. A piston (51) is positioned below the resilient diaphragm in the fuel outlet chamber (21) and has depending therefrom an elongated stem (52) which is received in a stem guide (53), with the stem guide having a tapered portion (54) extending into the passageway (22).

6 Claims, 2 Drawing Sheets

FUEL PRESSURE REGULATOR

TECHNICAL FIELD

This invention relates to internal combustion engines, and more particularly to a fuel pressure regulator for use in such engines.

BACKGROUND OF THE INVENTION

In a typical carbureted automobile engine, for example, fuel is delivered by a fuel pump from a fuel tank to the carburetor. The carburetor atomizes the fuel in the presence of air to create a combustible mixture of air and fuel which is delivered to the cylinders of the engine. The performance of the carburetor in creating a mixture which will burn cleanly and efficiently in the engine is sensitive to any fluctuations in the pressure of the fuel supplied to the carburetor. Therefore, it is important to accurately regulate the fuel pressure to ensure a uniform delivery of fuel to the carburetor. This is true for fuel injection systems as well.

It is known in the art to regulate the pressure of fuel being pumped from the fuel tank to the carburetor with regulators of the diaphragm-and-spring type. Such regulators typically have an upper chamber exposed to atmosphere, a middle chamber that has a fuel outlet opening that communicates with the carburetor, and a lower chamber that has a fuel inlet opening in communication with the fuel tank. A resilient, flexible diaphragm separates the upper chamber from the middle chamber and a valve separates the middle chamber from the lower chamber, the valve being actuated between open and closed positions by a valve actuating stem extending between the valve and the diaphragm which imparts the movements of the diaphragm to the valve. A diaphragm spring in the upper chamber bearing against the diaphragm urges the diaphragm and valve in one direction and fuel pressure in the middle chamber urges the diaphragm and valve in the other direction. Through selection of a diaphragm spring of the appropriate rate, the fluid pressure in the middle chamber can be maintained at a desired level. Typically, an adjustment screw is provided for changing the amount of force exerted by the diaphragm spring on the resilient diaphragm.

One of the problems with such spring-and-diaphragm regulators is that it can be difficult to convert the movement of the resilient diaphragm into a proper translational movement of the valve actuating stem necessary for obtaining the desired fuel pressure. It is known in the art to mount the valve actuating stem rigidly to the diaphragm by mounting metal plates on either side of the diaphragm, providing the plates and the diaphragm with coaligned holes therethrough and extending a portion of the actuating stem through the coaligned holes and securing it on the other side of the diaphragm as with a threaded nut. This arrangement rigidly secures the actuating stem to the diaphragm to ensure that movement of the diaphragm is reflected in movement of the valve. However, not all types of motions of the diaphragm should effect a movement of the valve actuating stem. For example, the resilient diaphragm may move in a sideways manner or may flex, and these types of movements should not be imparted to the valve actuating stem. Furthermore, this means of attaching the actuating stem to the diaphragm creates a hole in the diaphragm which may be prone to leaking fuel from the middle chamber to the upper chamber, which presents a safety hazard.

Such diaphragm-and-spring type regulators typically have a frusto-conically shaped valve for sealing against a valve seat. With this arrangement the portion of the valve that contacts the seat remains constant; in other words the same "contact patch" bears the burden of sealing the valve over the entire life of the valve, which can decrease the service life of the components of the regulator as a result of wear. Of course, any decreased service life requires a ready access to the various worn components for servicing thereof.

In automobile racing applications, the above identified problems can be magnified many times by the heightened demands placed on the fuel supply system during competition.

Accordingly, it is seen that a need yet exists for a fuel pressure regulator for automobiles which is durable, easily serviced and which converts movements of a pressure responsive diaphragm into translational movements of the valve actuating stem and valve without the necessity of a rigid connection between the valve actuating stem and the diaphragm. It is to the provision of such a fuel pressure regulator that the present invention is primarily directed.

SUMMARY OF THE INVENTION

In a preferred form the present invention comprises a fuel pressure regulator for automobiles comprising a body having first, second and third chambers. A resilient diaphragm separates the second and third chambers, and a fuel inlet communicates with the first chamber and a fuel outlet communicates with the second chamber. A passageway extends between the first and second chambers for permitting fluid communication therebetween. A ball valve means is positioned adjacent one end of the passageway for controlling fluid flow through the passageway. A first biasing means is provided for biasing the ball valve means to close the one end of the passageway. An actuating means is provided in or adjacent the second chamber for actuating the ball valve means to open the one end of the passageway. The actuating means comprises a piston positioned adjacent the resilient diaphragm and a valve actuating stem depending from the piston with its distal end adapted to bear against the ball valve means. A second biasing means is provided for biasing the resilient diaphragm to move the piston toward the first chamber. Stem guide means are provided within the passageway intermediate the ends of the stem for limiting the motion of the stem to a substantially linear, reciprocating motion.

The ball valve means comprises a valve seat and a movable ball. The movable ball is received within guide legs mounted to a lower plug which is removably mounted in a lower portion of the fuel pressure regulator body. Preferably, the valve seat, the stem guide, the stem and the passageway are coaxially positioned.

So constructed, the ball is free to rotate in operation, and therefore over time, the entire surface of the ball is utilized for sealing against the seat. The valve seat, stem guide, stem and passageway being coaxially positioned provide a sensitive and accurate fuel pressure regulator. Additionally, simply by removing the plug, ready access is provided for inspecting or servicing the ball, guide legs and the first biasing means.

Therefore, it is an object of the invention to provide a fuel pressure regulator for automobiles which is more durable and reliable than prior devices.

It is also an object of the invention to provide a fuel pressure regulator which is easily disassembled to inspect key elements thereof and is therefore easily serviced.

It is yet a further object of the invention to provide a fuel pressure regulator which is accurate and sensitive.

Other objects, features and advantages of the invention will become apparent upon reading the following specification in conjunction with the drawing figures.

BRIEF DESCRIPTION OF THE DRAWING FIGURES

DETAILED DESCRIPTION

Figure 1:
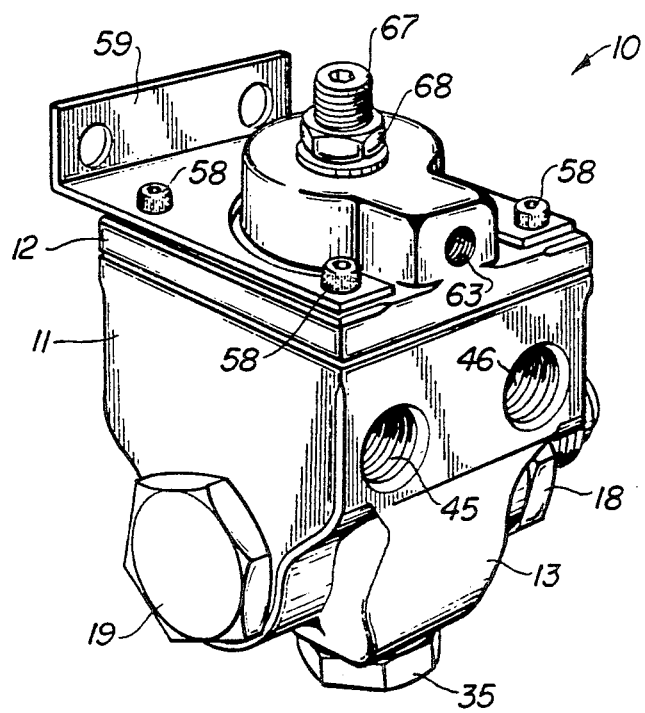
FIG. 1 is a perspective illustration of a fuel pressure regulator according to the present invention in a preferred form.

Turning now in more detail to the drawing figures, in which like reference numerals depict like parts throughout the several views, FIGS. 1-4 show a fuel pressure regulator 10 according to the present invention in a preferred form. The pressure regulator 10 comprises a lower body 11 and an upper body or cover 12. The lower body 11 is roughly the shape of an elongated square box, with a tapered lower portion 13. A fuel inlet chamber 14 is formed within the interior of the lower portion 13. A pair of opposed inlet ports 16 and 17 communicate between inlet chamber 14 and the exterior of the body 11. The inlet ports are threaded to receive a threaded inlet coupling 18 and a threaded inlet plug 19. Alternatively, inlet plug 19 may be replaced with a second inlet coupling 18.

A shallow, cylindrical, outlet chamber 21 is formed in an upper portion of the lower body 11. A central passageway 22 extends between inlet chamber 14 and outlet chamber 21. A threaded lower bore 23 is provided in the lower portion 13 of lower body 11 and is coalligned with a central portion of passageway 22.

A valve seat 26 is located coaxially in a lower end of passageway 22. The valve seat 26 has an internal opening extending through the valve seat and is roughly cylindrical with a flanged lower portion 27. The valve seat is inserted into the passageway 22 with an interference fit to secure the valve seat in the passageway. A hardened steel, spherical ball or valve element 29 is movably received below the valve seat 26. The ball 29 is biased upwardly and into engagement with the valve seat 26 by a suitable spring 31 which is received within a counterbored recess in a shouldered plug 32. Shoulder plug 32 has four upwardly extending, cylindrical guide bars 33 which are evenly spaced to create a cage for guiding or restricting the movement of the spherical ball 29. The shoulder plug 32 is received within a recess 34 of a lower access plug 35 which is threaded into the lower threaded bore 23. The access plug 35 carries a resilient seal 36 for sealing the threaded bore 23.

Figures 2, 3:
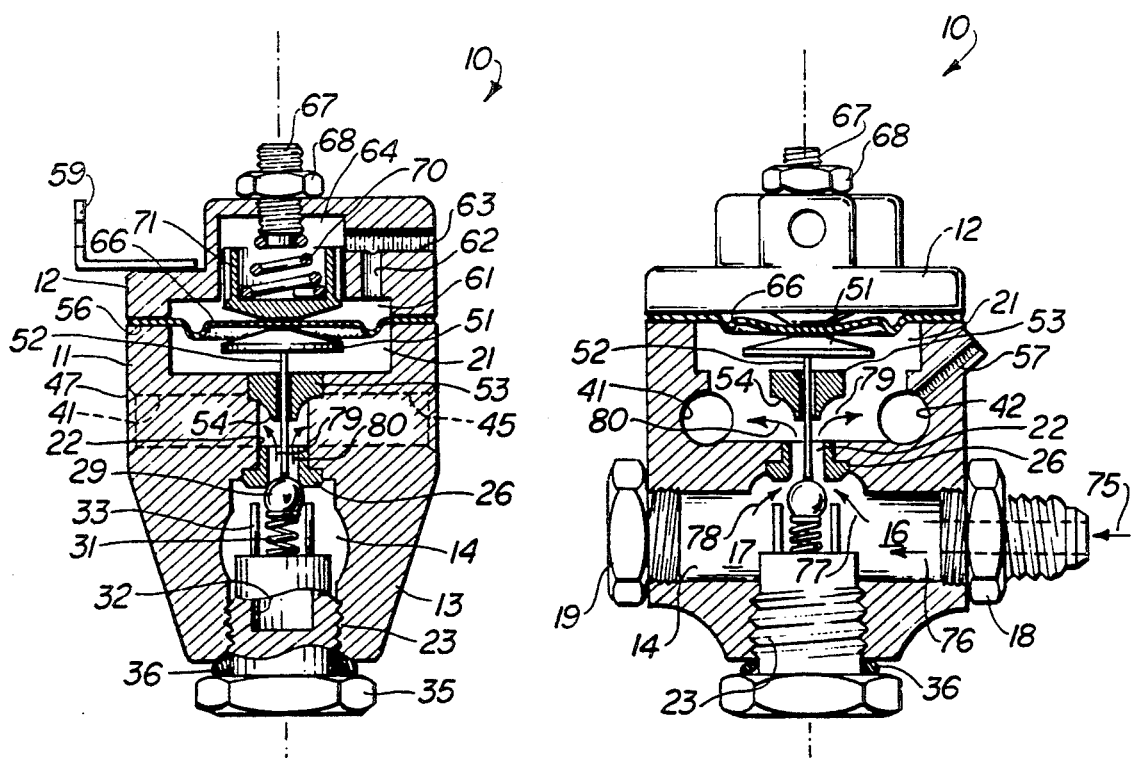
FIG. 2 is a partially sectional, side elevation of the fuel pressure regulator of FIG. 1.
FIG. 3 is a partially sectional, front elevation of a portion of the fuel pressure regulator of FIG. 1.
Figure 4:
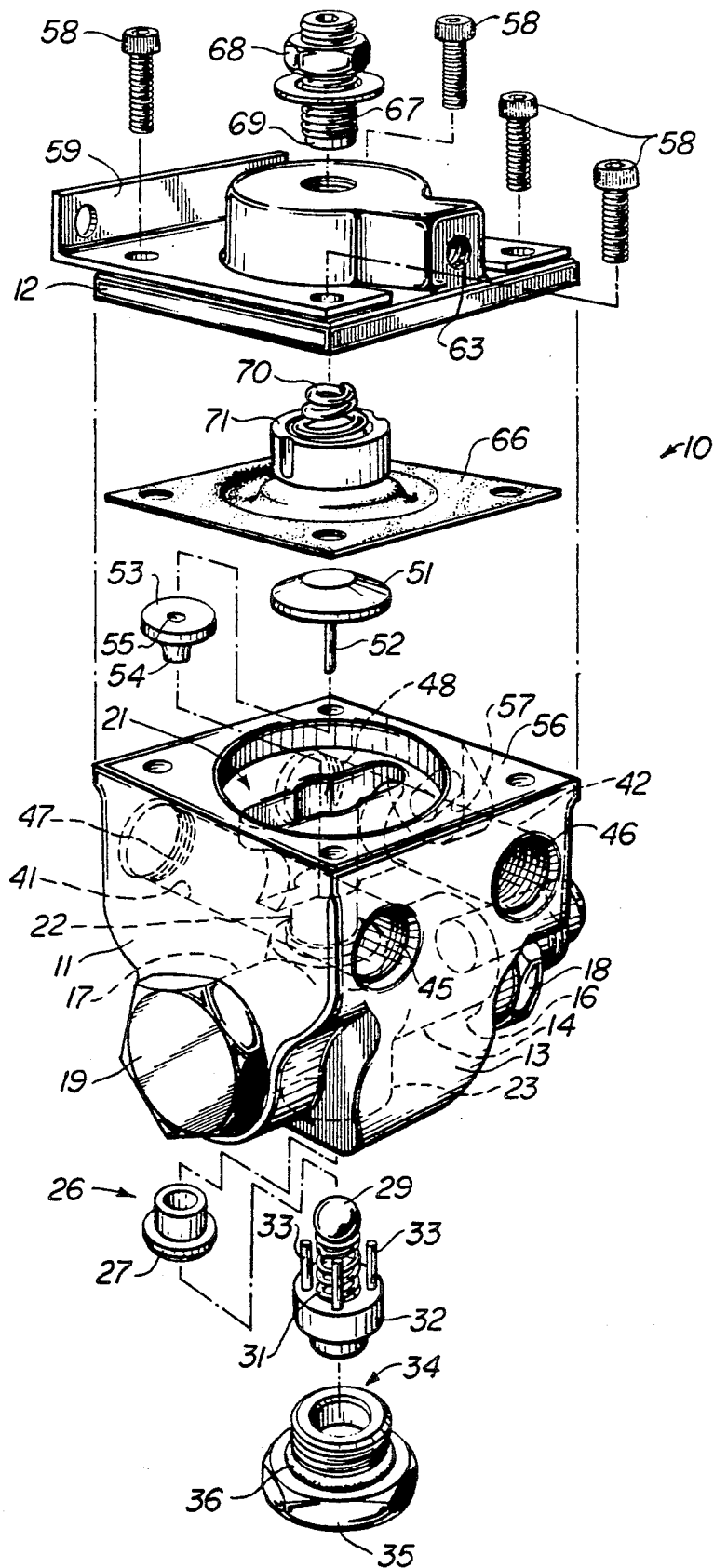
FIG. 4 is an exploded, perspective illustration of the fuel pressure regulator of FIG. 1.

A pair of outlet bores 41 and 42 (FIG. 3) are positioned in a upper portion of the lower body 11 and extend from one side of the lower body 11 completely through the body to an opposite side. The bores are threaded at their ends to form threaded fuel outlets 45, 46, 47 and 48 (FIG. 4). The outlet bores 41 and 42 are in communication with outlet chamber 21 and with the central passageway 22 (FIG. 3).

A piston 51 is positioned within the outlet chamber 21 and has a valve actuating stem 52 depending centrally therefrom. A stem guide 53 is mounted in an upper portion of the central passageway 22 and is positioned so that an upper portion of the stem guide lies flush with the plane of the bottom portion of the outlet chamber 21. The stem guide 53 is held snugly in the upper portion of the passageway 22. The stem guide includes a cylindrical bore 55 coaxial with passageway 22 and closely matched to the diameter of the stem, so as to limit or restrict the movement of the stem to substantially linear translation up and down through the stem guide. The stem guide 53 includes a tapered lower portion 54 which allows the stem guide to reach further downwardly into the passageway 22 to provide a more accurate guide without adversely restricting the flow of liquid fuel through the passageway.

The lower body 11 has a smoothly machined, symmetrical, planar upper surface 56. A threaded bore 57 extends between an outer surface of the lower body 11 and the outlet bore 42. The threaded bore 57 (FIG. 3) can be plugged or sealed with a suitable threaded fastener, or in the alternative can be used to communicate fuel pressure to a remote pressure sensing or pressure indicating gauge.

Cover 12 is adapted to be secured to the upper portion of the lower body 11 by means of four threaded fasteners 58 arranged in a square pattern. An L-shaped mounting bracket 59 is secured to the cover 12 by the fasteners 58 for mounting the regulator 10 to the vehicle. Cover 12 has an upper chamber 61 which is in communication with atmosphere by means of passageway 62 and threaded passageway 63. A cylindrical spring cup chamber 64 is formed in an upper portion of the cover 12 coaxial with passageway 22 and is in communication with the atmosphere by means of the passageway 63. A resilient, fuel impervious diaphragm 66 is disposed between a planar lower surface of upper cover 12 and the planar upper surface 56 of lower body 11 to form a partition between outlet chamber 21 and upper chamber 61. The lower surface of upper cover 12 is symmetrical and closely matching in shape to that of upper surface 56 of lower body 11.

An adjustment screw 67 is threaded through an upper portion of the cover 12 and extends into the spring cup chamber 64. A locking nut 68 is threaded onto the adjustment screw 67 for securing the adjustment screw in place. A lower portion of the adjustment screw 67 includes a shoulder 69 for receiving a coil spring 70. The coil spring 70 is received within a hollow, cylindrical spring cup 71 which in turn presses against an upper portion of the resilient diaphragm 66. The outer diameter of spring cup 71 is closely matched to the diameter of the spring cup chamber 64 so that the spring cup chamber acts as a guide to limit the spring cup to substantially translational motions.

OPERATION

The fuel pressure regulator 10 operates as follows to control the pressure of the fuel flowing therethrough. As illustrated in FIGS. 2 and 3, fuel is supplied from an unshown fuel pump and enters the regulator 10 through the inlet coupling 18 in the direction of arrow 75. Fuel under pressure passes through the coupling and enters into the fuel inlet chamber 14 and proceeds through the chamber in the direction of arrows 76, 77 and 78. With the ball 29 in the open position spaced from the seat 26, fuel flows through the valve in the direction of arrow 77 and into and through the passageway in the seat 26. Fuel continues in the direction of arrows 79 and 80 to enter the outlet bores 41 and 42 and the outlet chamber 21 below the impervious resilient diaphragm 66. In this way, outlet chamber 21 is completely filled with fuel of a substantially uniform pressure.

The aggregate fuel pressure below the resilient diaphragm 66 within the outlet chamber 21 tends to lift the resilient diaphragm against the bias of diaphragm spring 70, which tends to allow the lower ball spring 31 to urge the ball 29 into a closed, seating position against the valve seat 26. Above the resilient diaphragm 66 within the upper chamber 61, atmospheric pressure communicated through passageways 62 and 63, together with the mechanical biasing force exerted by the diaphragm spring 70 tends to push the diaphragm downwardly. This tends to cause the piston 51 and the stem 52 to move the ball 29 out of its seating position and into an open position, as shown in FIG. 3. During normal operation, this causes the ball to fluctuate between closed, partially opened and more fully opened positions to maintain a desired fuel pressure in chamber 21.

Adjustment of the operating pressure of the regulator proceeds as follows. A fuel pressure gauge is connected to threaded bore 57 and pressure is provided through inlet 16. If the gauge pressure is then greater or less than desired, one would loosen lock nut 68 and adjust the pressure by turning the adjustment screw 67. Threading the adjustment screw 67 inwardly increases the operating pressure, while threading the adjustment screw outwardly decreases the operating pressure. Upon the attainment of the desired operating pressure, the lock nut 68 is then tightened to secure the adjustment screw in the correct position.

Easy access may be had to the ball valve for inspection of the ball, valve seat and guide legs by unthreading access bolt 35 and removing the access bolt, the shoulder plug carrying the guide legs 33 and the ball valve 29. Of course, reassembly is simply the reverse of this.

Easy access may be had to the diaphragm 66 by removing the four bolts 58 and loosening the body lower portion 11 from the upper cover 12. The diaphragm 66 may be inspected or replaced without disturbing the valve components, the piston 51 or the spring cup 71.

As has been pointed out above, the stem 52 is closely guided within a stem guide 53 coaxial with the passageway 22. Furthermore, valve seat 26 is also coaxial with passageway 22 and cylindrical spring cup chamber 64 maintains the spring cup 71 coaxial with the passageway 22. Arranging these components coaxially and providing a stem guide 53 for closely guiding the stem 52 ensures that the end of the stem distal from the piston is maintained very close to the center of the passageway 22 as the stem moves up and down within the guide 53. With the seat 26 being coaxial with the passageway 22 and the ball 29 being spherical, when the ball 29 is seated, the stem always engages the "crown" or highest part of the ball within the seat. This provides a sensitive and accurate valving mechanism. Furthermore, the arrangement tends to minimize side to side movements of the piston 51 and the spring cup 71 relative to the resilient diaphragm 66, and tends to minimize any lateral forces exerted on the resilient diaphragm. This tends to prolong the life of the diaphragm, often one of the least durable parts of a fuel pressure regulator.

The use of a ball guided within guide legs has several key advantages. The guide legs are positioned to allow the ball to move up and down and away from and toward the seat 26 unrestricted while allowing the ball 29 a small amount of side-to-side movement. Should the ball 29 be urged by the spring 31 back toward the seat 26, but slightly misaligned, the ball has a tendency to roll into the proper seated position because of its inherent roundness. Thus, the ball is self-seating. Furthermore, because no stem need extend through the ball to ensure proper seating, the ball is free to rotate in any direction, which allows the entire surface of the ball to be used as a sealing surface against the valve seat 26 over time. For example, in a first instance the ball may be positioned to have a particular portion seated against the seat and then after being moved away from the seat and rotating slightly it will present a different portion of the spherical surface against the seat. By using the entire surface of the ball a long service life is provided.

An important application for this invention is in the automobile racing field. To that end, the symmetrical configuration of the upper surface 56 of the body lower portion 11 allows the body lower portion to be turned in any of four directions relative to the upper cover 12 to orient the various inlets and outlets in a convenient configuration for the particular mounting application.

While the invention has been disclosed in a preferred form, it will be readily apparent to those skilled in the art that many additions, deletions and modifications may be made thereto without departing form the spirit and scope of the invention as set forth in the following claims.

I claim:

1. A fuel pressure regulator for internal combustion engines of automobiles and the like, comprising:
    a body including first, second and third chambers:
    a resilient impervious diaphragm separating said second and third chambers;
    a fuel inlet communicating with said first chamber;
    a fuel outlet communicating with said second chamber;
    a passageway for permitting fluid communication between said first and second chambers;
    a ball valve means adjacent one end of said passageway, said ball valve means comprising a movable ball and a cylindrical valve seat;
    first biasing means for biasing said ball valve means to close one end of said passageway;
    actuating means for actuating said ball valve means to open said one end of said passageway, said actuating means comprising a piston positioned in said second chamber in abutment with one side of said resilient impervious diaphragm and a stem extending from said piston with its distal end adapted to bear against the ball of said ball valve means;
    second biasing means in said third chamber in abutment with the other side of said resilient impervious diaphragm for biasing said resilient diaphragm to move said piston toward said first chamber;
    stem guide means positioned between said first and second chambers along the length of said stem and intermediate the ends of said stem for guiding said stem to limit the motion of said stem to a substantially linear, reciprocating motion while in contact with the ball of said ball valve means;
    a plug member removably mounted to said body at said first chamber;

ball guide bars mounted to said plug member in said first chamber for surrounding the ball and first biasing means and for maintaining the ball and the first biasing means aligned with the valve seat, whereby when the plug member is removed from the body the first biasing means and ball are removed with the plug from the first chamber and the valve seat and stem are exposed.

2. A fuel pressure regulator as claimed in claim 1 wherein said ball guide means comprises a plurality of mutually spaced, elongated, parallel guide legs positioned about said movable ball whereby said ball is movable in directions parallel to said guide legs.

3. A fuel pressure regulator as claimed in claim 1 wherein said first biasing means comprises a spring positioned between said guide legs and releasably mounted to said removable member, whereby with the removable member removed, easy access for service is provided to said ball, valve seat, spring, and said guide legs.

4. A fuel pressure regulator as claimed in claim 1 wherein said stem guide comprises a tapered portion through which said stem guide passageway extends.

5. A fuel pressure regulator as claimed in claim 1 wherein said passageway, said stem, said valve seat, and said stem guide means are coaxially positioned.

6. A fuel pressure regulator for internal combustion engines of automobiles and the like, comprising: a body defining first, second and third chambers, a fuel inlet communicating with said first chamber for admitting gasoline and the like to said first chamber, a fuel outlet communicating with said second chamber for delivering fuel to an internal combustion engine, a passageway extending between said first and second chambers for delivering fuel from said first chamber to said second chamber, a ball valve in said first chamber adjacent one end of said passageway for closing said passageway, first spring means biasing said ball valve toward its closed position with respect to said passageway, a resilient impervious diaphragm separating said second and third chambers, the improvement therein of:

second spring means in said third chamber in abutment with one side of said impervious diaphragm for biasing said diaphragm toward said ball valve;

a piston in said second chamber adjacent the other side of said impervious diaphragm;

an elongated stem having one end juxtaposed said piston and extending through said passageway and having its other end juxtaposed said ball valve so that movement of said diaphragm controls the position of said ball valve;

guide means positioned about said elongated stem for confining said stem to linear reciprocable movements in response to the movements of said diaphragm, piston and ball valve;

a plug member removably mounted to said body at said first chamber; and ball guide bars mounted to said plug member in said first chamber for surrounding the ball valve and the first spring means and for maintaining the ball valve and first spring means aligned with the passageway, whereby when the plug member is removed from the body the spring means and ball valve are removed from the first chamber and the passageway and the elongated stem.

* * * * *